Feb. 3, 1925. 1,524,936
J. H. JOHNSON
SYSTEM FOR THE PRESERVATION OF BAKERY PRODUCTS
Filed April 12, 1924 2 Sheets-Sheet 1

INVENTOR.
JOHN. H. JOHNSON.
BY,
ATTORNEYS.

Feb. 3, 1925.                                                    1,524,936
                        J. H. JOHNSON
           SYSTEM FOR THE PRESERVATION OF BAKERY PRODUCTS
                    Filed April 12, 1924        2 Sheets-Sheet 2
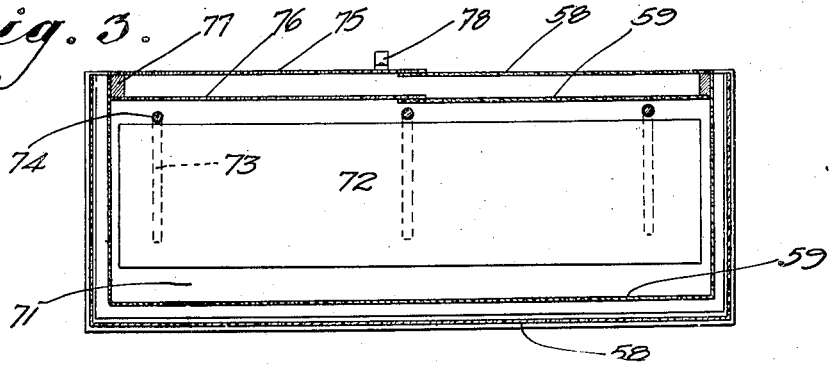
INVENTOR
JOHN. H. JOHNSON.
BY,
ATTORNEYS, Patented Feb. 3, 1925.

1,524,936

UNITED STATES PATENT OFFICE.

JOHN H. JOHNSON, OF SANTA BARBARA, CALIFORNIA.

SYSTEM FOR THE PRESERVATION OF BAKERY PRODUCTS.

Application filed April 12, 1924. Serial No. 706,219.

*To all whom it may concern:*

Be it known that I, JOHN H. JOHNSON, a citizen of the United States, residing at Santa Barbara, in the county of Santa Barbara and State of California, have invented new and useful Systems for the Preservation of Bakery Products, of which the following is a specification.

My present invention relates to a system and apparatus for the preservation of bakery products. It may be understood to be an object of this invention to provide means and methods of maintaining or restoring the freshness of products such as bread, biscuits, doughnuts, cakes and pastry; and preferred embodiments of my invention may be such as to maintain or render such products entirely fit to be sold or served as "fresh" products, even after a lapse of several hours or days subsequently to actual baking.

If bakery products are kept in a damp place, at ordinary temperatures, it is well known that they are likely to "sag" or toughen, and they may soon become moldy. If, on the other hand, they are kept well exposed to the air, they soon dry out, becoming harder and harder until they become so entirely rigid as to be unfit for human consumption. Whether permitted to become tough or permitted to become hard, although not allowed to become moldy, leftover bakery products have in general been a source of substantial loss, alike to bakers, dealers, hotel men and householders; and it is an object of this invention to diminish or entirely obviate losses due to early and avoidable deterioration of bakery products.

Whether or not the freshness of bakery products is especially important from a dietetic point of view, every baker and every dealer knows that there is and will be a large and constant demand for fresh breads, biscuits, rolls, doughnuts, coffee cakes, gems, muffins, and the like; and it is an object of this invention to provide means whereby, at a comparatively slight expense for equipment and thermal values, and with substantial sanitary advantages, bakery products may be kept for comparatively long periods in substantially the same fresh condition as when taken from an oven, thereby enabling the dealer or lunch counter proprietor or other purveyor thereof always and promtly to meet the demand for a fresh product; and preferred embodiments of my invention, instead or relying upon actual additions of moisture or upon a mere application of heat, may comprise means for maintaining all or almost all of the original moisture content within bakery products during an application of only sufficient heat to keep the products in substantially their original conditions. The products of a single baking at a single bakery may thus be sold fresh at any required number of near or remote points.

Neither control of moisture nor control of temperature being alone sufficient to maintain bakery products in a satisfactory fresh condition, I discovered the practicability of preserving or conditioning bakery products by keeping the same suitably hot without causing or permitting an undue escape of moisture therefrom; this being carried out by heating all of the walls of the food container to substantially the same temperature thus minimizing the internal circulation of air within the food compartment. The principles of my mentioned discovery may be applied in a wide variety of different embodiments of my invention, some of which may be especially suitable for use in retail stores, others being respectively more appropriate for lunch counter or household use, and all being capable of either maintaining or restoring the quality of bakery products.

Other objects of my invention will appear from the following description of alternative embodiments thereof, taken in connection with the appended claims and the accompanying drawings, in which Fig. 1 is the preferred embodiment of my invention showing the use of the same in combination with an electric toaster.

Fig. 3 is a horizontal section taken on the line 3—3 of Fig. 2.

Figure 1:
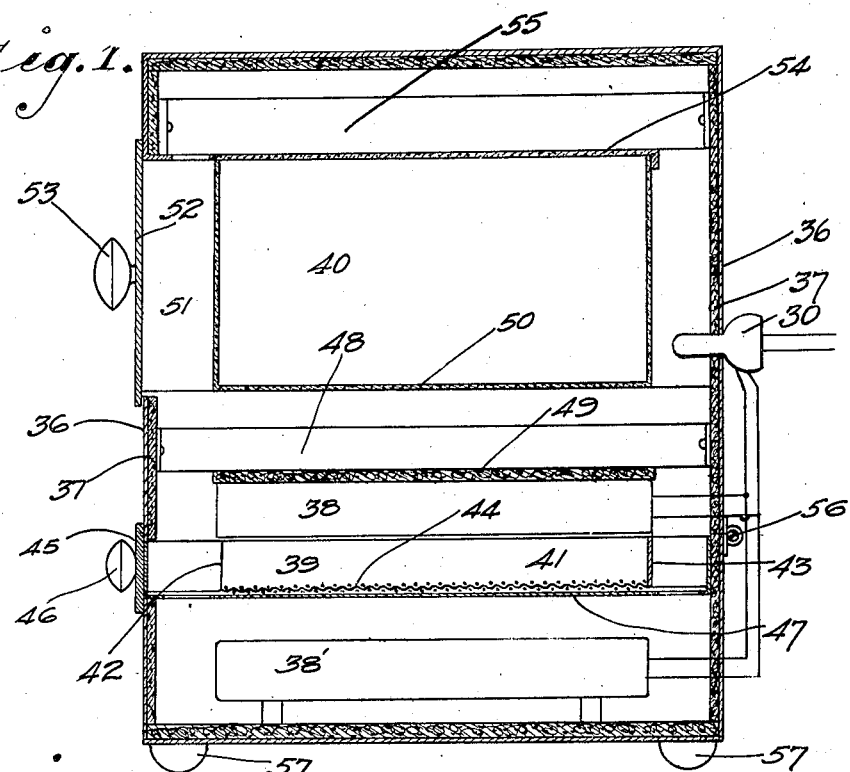

In the preferred form of my invention illustrated in Fig. 1, this being the combined toaster and preserver, the outer walls 36 may be provided throughout with an asbestos lining 37, which acts as an insulation to prevent the too rapid escape of heat through the outer walls, both of these elements being shown as spaced away from the walls of the respective devices enclosed therein, to-wit, a pair of heaters 38, 38', which may be provided with any preferred type of thermostatic control, a toasting drawer 39, and a preserving compartment 40. The toasting drawer 39 is shown as comprising side elements 41 and front and back plates 42, 43 forming a rectangular frame supporting a bottom 44 having an open mesh, the side elements 41 being shown as carried forward and connected with a front plate 45 provided with a handle 46, the entire drawer being adapted to slide above an apertured horizontal partition 47, supported from the outer walls.

The upper heater 38 and the preserver 40 may both be supported from intermediate horizontal reinforcing bars 48, an asbestos baffle 49 being shown as interposed above the heater, and spacing strips, or their equivalent, being interposed beneath the bottom 50 of the preserver 40, whose side walls 51 may be integral with or connected to a front plate 52 carrying a handle 53. To form a tight cover for the preserver compartment 40, closing and effectively sealing the same when the drawer is in the normal position indicated in Fig. 1, a fixed top plate 54 may be secured, as by means of transverse bars 55 also extending between the front and back walls 36. Although the toast may ordinarily be inserted in the drawer 39 by a horizontal movement of the same, I may optionally provide a hinge 56, pivotally connecting the entire upper section comprising the heater 38 and the preserver 40 relatively to a lower fixed section shown as mounted upon legs 57. As in the alternative organization intended for cafeteria or lunch counter use, it will be seen that this embodiment of my invention comprises inner and outer walls spaced apart to provide for a free circulation of heated air, and means for supporting bakery products in a completely enclosed compartment at a predetermined temperature. For treating rolls, the toaster may be omitted.

In this embodiment of my invention toast or other baked food may be treated or preserved in the compartment 40 for many hours after it has left the toaster or baking oven without the condition of the food changing noticeably from that of freshly toasted or baked food. In this embodiment the heat rising either from the heating element 38 or 38′ or both, passes upwardly around all of the side walls and in contact with the top and bottom of the substantially tight drawer 40. This heated air also comes in contact with the external walls 36 where (even though radiation is reduced by insulation) it becomes cooled and therefore passes downwardly again to be reheated, thus causing a continual circulation about all of the external surfaces of the compartment 40. On account of this construction once the drawer becomes heated there is no radiation into or out of the drawer and the air within the drawer remains stationary and wholly ceases its circulation. It has been found that with this construction the moisture content of bakery goods or even different parts of the same bakery goods, will remain substantially unchanged for many hours. Parkerhouse rolls, graham gems, bran muffins, tea biscuits, butter rolls, and wheat bread, may be kept in this compartment under a temperature of from 120 to 140° F. without noticeably changing their condition for a period of several hours. A thermostatic element 30 of any suitable or well known construction controls the electric circuit to the heating elements 38 and 38′ such as to maintain the temperature in the space surrounding the compartment 40 substantially constant at any desired temperature between 120 and 200° F. The construction of the device is such that when the heating elements 38 and 38′ are kept in continuous operation the temperature in the compartment 40 will not reach the boiling point of water.

Figure 2:
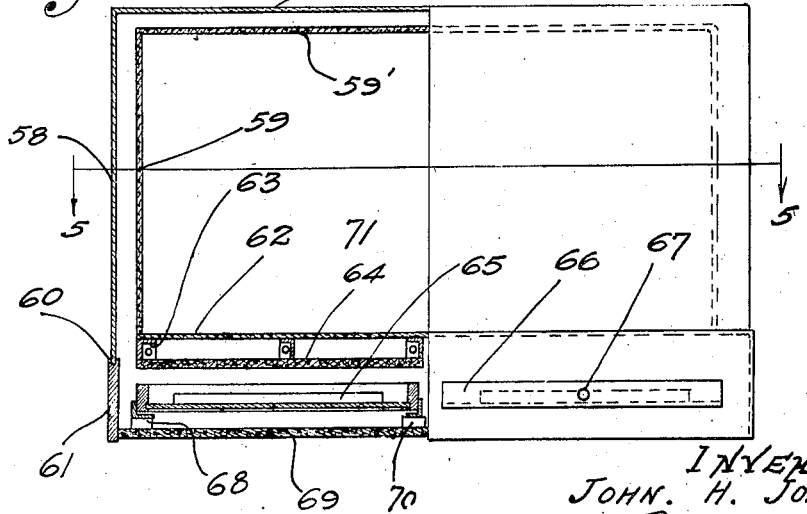
Fig. 2 is a further alternative embodiment in which the full advantages of my invention are only partially realized, this embodiment showing the same as applied to a show case having double walls and doors of glass.

Figs. 2 and 3 illustrate a further alternative embodiment of my invention, this form thereof being suitable for use as a show case constructed entirely, or provided with a door, of glass. The parallel and substantially vertical front and end walls of this embodiment of my invention may comprise outer glass plates 58 and inner glass plates 59, which may be secured together at their corners in any usual or preferred way, similar glass plates 58′, 59′, correspondingly spaced apart, being optionally employed as a transparent top, the wall elements 58 being shown as supported in grooves 60 provided in rabbeted mop-board strips 61, and the interior walls 59 being shown as supported from an inner floor 62, which may also be of glass, this floor being shown as in turn carried by horizontal angle irons 63, adapted to support also an asbestos baffle plate 64 above a heater 65. The heater 65 may optionally be carried by a drawer 66 having a handle 67 and shown as slidable upon angle irons 68, spaced from an insulating bottom 69 by blocks 70; and access to the inner compartment 71, in which bakery products are to be displayed, as by positioning the same upon glass shelves 72, shown as supported by arms 73 extending from uprights 74, may be obtained by means such as a sliding door comprising an outer plate 75 and an inner plate 76, spaced apart and secured together by means such as a strip 77 extending vertically therebetween, a handle 78 being provided upon the outer plate, and the interval between the plates 75 and 76 being substantially the same as that between the fixed plates 58, 59, in contact with which they may slide. The heat imparted by the electric heater 65, or its equivalent, being suitably controlled, and the heated air being free to rise between the double walls described, and escape of moisture being checked by the described tight closure comprising a double-walled sliding door, it will be understood that this embodiment of my invention, like those above described, comprises means for maintaining bakery products at a preferred elevated temperature, without permitting undue escape of moisture therefrom.

In general, I consider it advantageous to embody heating means and a thermostatic control in my preservers, in order to avoid danger of an undue elevation of temperature, it being obvious that the employment of a temperature above 212° F., or the boiling point of water, must tend to an unduly rapid loss of water, that is to say, an unduly rapid drying of bakery products. A temperature of substantially 200° F. may be regarded as a maximum for the maintenance of freshness without unduly rapid drying, but a higher temperature may be tolerated when early sale or use of the products is contemplated. About 120° may be a suitable average temperature under ordinary conditions.

The use of steam in preserving rolls and other bakery products has been found unsatisfactory, but the use of electricity is especially advantageous as avoiding exposure to fumes or any external wetting, and also as permitting easy and reliable regulation of temperature; and it will be understood that any device embodying my invention may be made as large and provided with as many separate compartments as may be suitable to its intended use, permitting the bakery products, or their equivalent, to be spread out in a suitably thin layer.

In order to realize the full benefits and advantages of my invention, it is important that circulation of air within the preserving compartment be minimized. Of course, when food is first put into a heated compartment, circulation of air is created by the fact that the food is at a different temperature from the air in the compartment, but after the food has been brought to the temperature of the air in the compartment, further circulation of air is substantially eliminated by the fact that all of the outside walls of the compartment are heated to the same, or substantially the same, temperature. In the embodiments herein disclosed, in which one wall of a compartment is exposed to outside radiation, circulation of air is produced to a limited extent and to such an extent the preserving characteristics of my invention are only partially realized.

Although I have herein described several alternative embodiments of my invention, it should be understood that various features thereof may be independently employed; additional modifications may readily be devised by those skilled in this art, without the slightest departure from the spirit and scope of my invention, as the same is indicated above and in the following claims; and the principles of my invention will admit of the employment of heat from any convenient sources, including bake ovens and ranges heated by electricity or otherwise.

I claim as my invention:

1. A device for treating or preserving cooked food comprising a food compartment, external means for heating all parts of said compartment to equal temperature below the boiling point of water, and means to effectively prevent heat radiation from any wall of said compartment whereby the circulation of air within the compartment is minimized.

2. A device for treating or preserving cooked food to restore it to or maintain it in the same condition as when freshly cooked, comprising an effectively sealed food compartment and means to heat and to maintain all of the walls of said compartment heated to substantially the same temperature, whereby internal circulation of air within the compartment is minimized after the food has attained the same temperature as the compartment.

3. A device for treating or preserving cooked food, comprising an outer enclosure, an effectively sealed inner food-receiving compartment, means to circulate a heated medium in contact with all of the outer walls of said inner food-receiving compartment, whereby all parts of said compartment will be substantially equally heated.

4. The method of treating or preserving cooked food comprising maintaining the food for several hours at a temperature between 120° and 200° F. in an equally heated substantially quiescent atmosphere, the moisture content of which is such that the food will neither absorb nor give off substantial quantities of moisture.

In testimony whereof, I have hereunto set my hand at Los Angeles, California, this 31st day of March 1924.

JOHN H. JOHNSON.